US006978044B2

(12) United States Patent
Akagi

(10) Patent No.: US 6,978,044 B2
(45) Date of Patent: *Dec. 20, 2005

(54) PATTERN STRING MATCHING APPARATUS AND PATTERN STRING MATCHING METHOD

(75) Inventor: Takuma Akagi, Yokohama (JP)

(73) Assignee: Kabushiki Kaisha Toshiba, (JP)

( * ) Notice: Subject to any disclaimer, the term of this patent is extended or adjusted under 35 U.S.C. 154(b) by 60 days.

This patent is subject to a terminal disclaimer.

(21) Appl. No.: 10/813,526

(22) Filed: Mar. 30, 2004

(65) Prior Publication Data

US 2004/0184663 A1    Sep. 23, 2004

Related U.S. Application Data

(62) Division of application No. 09/626,646, filed on Jul. 27, 2000, now Pat. No. 6,738,515.

(30) Foreign Application Priority Data

Aug. 6, 1999    (JP) ................... 11-224438

(51) Int. Cl.[7] .............................................. G06K 9/00
(52) U.S. Cl. ..................... 382/187; 382/218; 382/229
(58) Field of Search ............................. 382/185, 186, 382/187, 209, 217, 218, 228, 229, 230, 310; 707/2

(56) References Cited

U.S. PATENT DOCUMENTS

| 5,757,959 | A | 5/1998 | Lopresti ...................... 382/186 |
|---|---|---|---|
| 5,802,205 | A | 9/1998 | Emico et al. ................ 382/187 |
| 5,832,474 | A | 11/1998 | Lopresti et al. ................. 707/2 |
| 5,850,480 | A * | 12/1998 | Scanlon ....................... 382/229 |
| 5,963,666 | A * | 10/1999 | Fujisaki et al. ............. 382/187 |
| 6,047,093 | A | 4/2000 | Lopresti et al. ............. 382/310 |
| 6,131,102 | A * | 10/2000 | Potter .......................... 715/533 |
| 6,597,809 | B1 | 7/2003 | Ross et al. .................. 382/229 |

OTHER PUBLICATIONS

Elliman, D.G. et al., "A Review of Segmentation and Contextual Analysis Techniques for Text Recognition," Pattern Recognition, Pergamon Press Ing., Elmsford, N.Y., US, vol. 23, no. 3/4, 1990, pp. 337-346; pp. 340-341, Sec. "3.2.1 String Matching".

Bertossi, A.A. et al., "String Matching with Weighted Errors," Theoretical Computer Science, Amsterdam, NL, vol. 73, no. 3, Jul. 22, 1990, pp. 319-328, figure 1.

* cited by examiner

*Primary Examiner*—Samir Ahmed
(74) *Attorney, Agent, or Firm*—Michael Best & Friedrich LLP

(57) ABSTRACT

This invention is to compare each character of a first character string with each character of a second character string, vote for a matrix having two sides corresponding to the characters of the first character string and the characters of the second character string and calculate values of the voting result for respective components arranged in an oblique direction of the matrix. The matching result is determined based on the calculated values of the voting result. As a result, a high-speed and highly precise matching process which is noise-resistant and takes the character arrangement into consideration can be attained.

8 Claims, 10 Drawing Sheets

PATTERN STRING MATCHING APPARATUS AND PATTERN STRING MATCHING METHOD

CROSS-REFERENCE TO RELATED APPLICATIONS

This application is a division of U.S. patent application Ser. No. 09/626,646, filed Jul. 27, 2000 now U.S. Pat. No. 6,738,515, which is based upon and claims the benefit of priority from the prior Japanese Patent Application No. 11-224438, filed Aug. 6, 1999, the entire contents of which are incorporated herein by reference.

BACKGROUND OF THE INVENTION

This invention relates to a pattern string matching apparatus and a pattern string matching method for use in a character recognition apparatus. The apparatus and method is designed to effect matching process for matching, for example, a first character string which has been recognized by character recognition and are to be matched, and candidates of a second character string, which is registered in a database.

Hitherto, a pattern matching process is performed, as an important process, in a character recognition apparatus in order to obtain the results of character recognition. The pattern matching process achieves matching (comparison) between candidates of a first character string which has been recognized by character recognition and are to be matched and candidates of a second character string, which is stored in a database (dictionary). Thus, the pattern matching process accomplishes the best matching between a string of characters obtained by character recognition and one of the strings of characters, registered in the database.

When the pattern string matching process is effected, various combinations of candidates of the first character string are provided according to character candidates obtained by character recognition. Further, a large number of candidates of the second character string which are matched with the first character string are provided.

As the conventional pattern string matching process, a DP matching method, a matching process by a voting method and the like are provided.

In the DP matching method, a pass searching process is effected for a plurality of character candidates constructing the first character string. However, in the DP matching method, if the candidates of recognized characters of the first character string are increased in an order of first, second, third . . . , a searching space is exponentially increased and the processing speed is extremely lowered.

Further, the matching process performed by the voting method is to vote for candidates of the second character string sequentially, by comparing each candidate of the second character string with the first character string, character by character, and then to select the candidate of the second string, which has the largest voted score. However, in this method, the character arrangement of the character string is not taken into consideration. Therefore, in a case where characters constructing the first character strings are the same but the character arrangements thereof are different, the character strings cannot be distinguished from each other. Particularly, in cultural areas using alphabetic characters, since the number of types of letters is as small as 26, the above problem becomes significant.

Therefore, it is the most important subject of the pattern string matching process how to efficiently and correctly effect the matching process for a plurality of candidates of a character string and a plurality of candidates of a character string. That is, it is required to develop a pattern string matching process for effecting the matching process at "high speed" with "the character arrangement taken into consideration".

Further, in the pattern string matching process, noise becomes a problem. For example, suppose a case wherein cut-out of the character fails and a character different from the word is contained in the first character string in the process for recognizing the characters constructing the first character string. In this case, even if a correct character string is contained in the first character string, it becomes impossible to match them by use of the conventional method such as the DP matching method in many cases.

If the voting method is used, it is difficult to get information on a matched portion after the matching process and it is difficult to remove the noise and separately recognize the character.

Thus, the matching process which is highly "noise-resistant" and can "specify the noise position" with high precision is required.

BRIEF SUMMARY OF THE INVENTION

As described above, it is required to develop a high-speed and highly precise matching process with the character arrangement taken into consideration and an object of this invention is to provide a pattern string matching apparatus and pattern string matching method capable of effecting the high-speed and highly precise matching process with the character arrangement taken into consideration.

Further, it is required to develop a matching process which is highly noise-resistant and can specify the noise position and an object of this invention is to provide a pattern string matching apparatus and pattern string matching method capable of effecting the matching process which is highly noise-resistant and can specify the noise position.

The above object can be attained by a pattern string matching apparatus according to one aspect of this invention for effecting a matching process between first and second pattern strings each including a plurality of patterns, comprising voting means for voting according to a position of a matched pattern in the first pattern string and a position of a matched pattern in the second pattern string when the pattern of the first pattern string is matched with the pattern of the second pattern string; and determining means for determining the result of matching based on the result of voting by the voting means.

A pattern string matching method according to another aspect of this invention for effecting a matching process between first and second pattern strings each including a plurality of patterns, comprising the steps of voting according to a position of a matched pattern in the first pattern string and a position of a matched pattern in the second pattern string when each pattern of the first pattern string is matched with each pattern of the second pattern string; and determining the result of matching based on the result of voting.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention with reference to the accompanying drawings.

Figure 1:
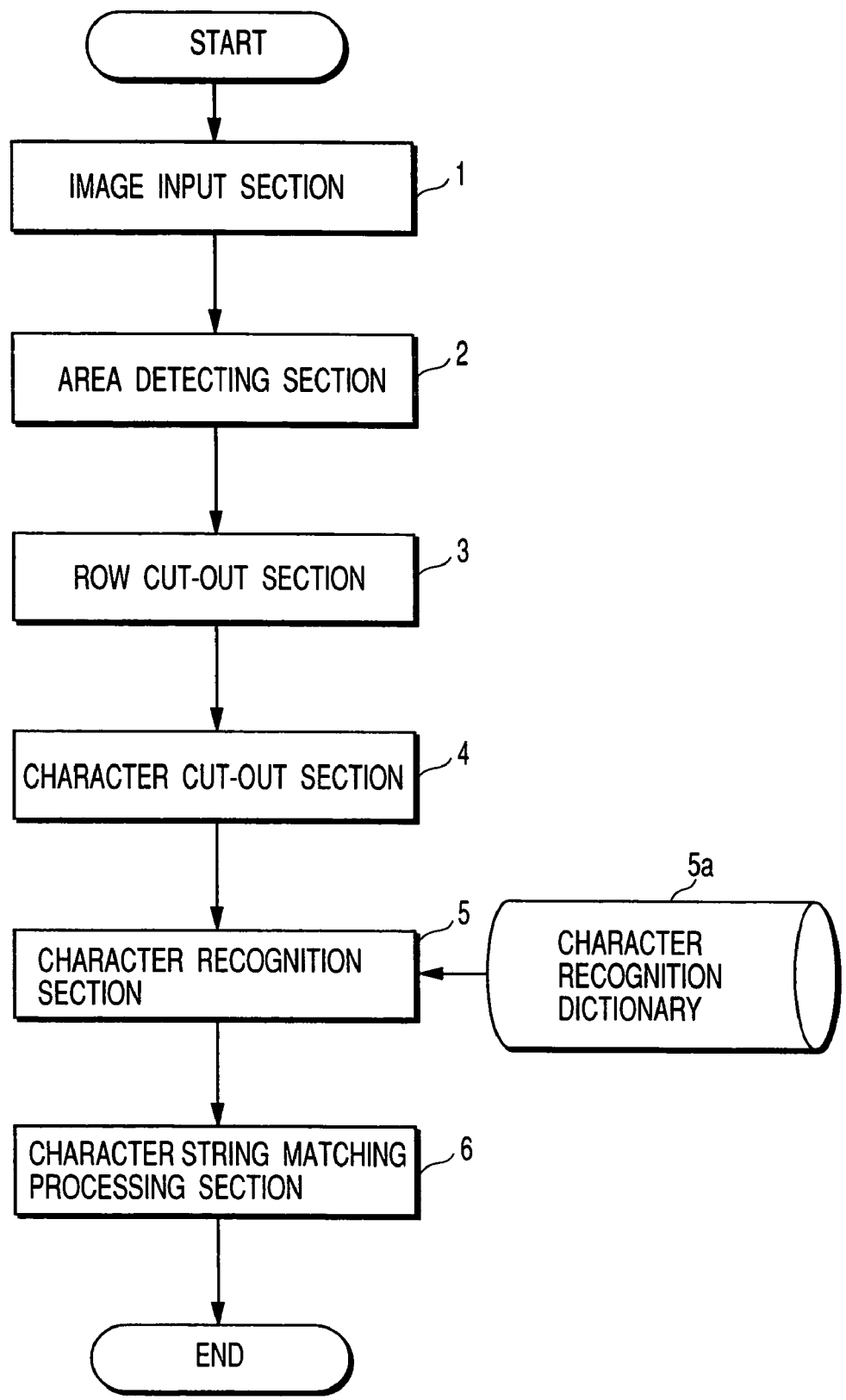
FIG. 1 is a diagram showing the schematic construction of a character recognition apparatus according to one embodiment of this invention.

FIG. 1 is a diagram schematically showing the whole construction of a character recognition apparatus according to one embodiment of this invention. The character recognition apparatus includes an image input section 1, area detecting section 2, row cut-out section 3, character cut-out section 4, character recognition section 5, and character string matching processing section (pattern string matching apparatus) 6.

In the image input section 1, an image is input. The area detecting section 2 detects an area in which a character or characters are described in the image input via the image input section 1. The row cut-out section 3 cuts out a character row from the area detected by the area detecting section 2. The character cut-out section 4 cuts out each character candidate from the character row cut out by the row cut-out section 3.

The character recognition section 5 effects the character recognition process for each character candidate cut out by the character cut-out section 4. In the character recognition process, a character (pattern) image is compared with characters (patterns) stored in a character recognition dictionary 5a to select candidates of recognition character.

The character string matching processing section 6 effects the matching process for a first character string with a second character string. The first character string is a character string such as a word based on the recognition character candidates selected by the character recognition section 5. The second character string is a character string stored in a prepared database (described later). In other words, the character string matching section 6 performs matching process for matching, for example, a first character string which has been recognized by character recognition and are to be matched, and candidates of a second character string, which is registered in a data base. As a result, the candidate of the second string, which is more similar to the first character string than any other candidate is output as a recognized string of characters.

Figure 2:
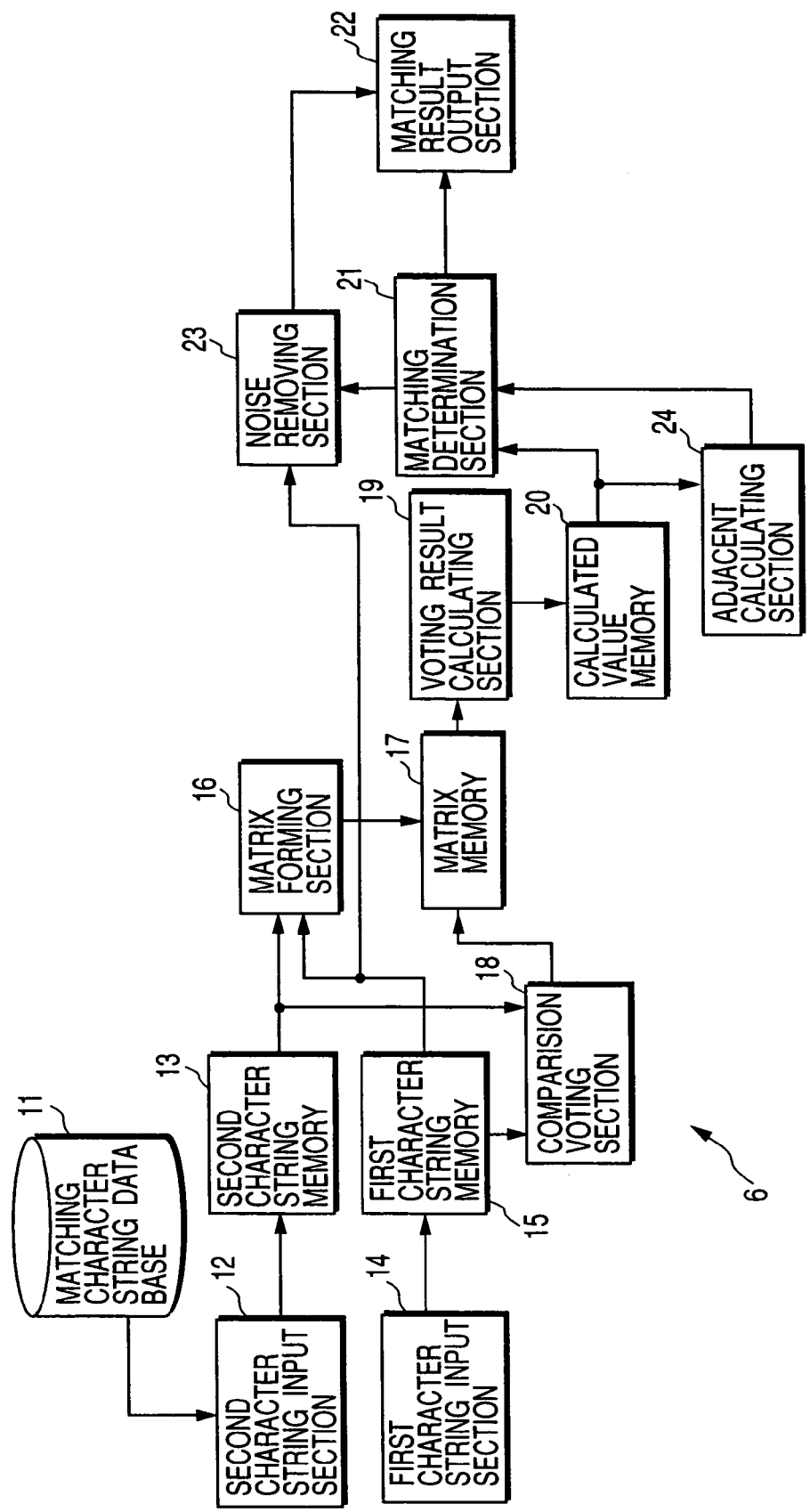
FIG. 2 is a block diagram showing the schematic construction of a character string matching processing section.

FIG. 2 is a block diagram showing the construction of the character string matching processing section 6. As shown in FIG. 2, the character string matching processing section 6 includes a matching character string data base (character string matching dictionary) 11, second character string input section 12, second character string memory 13, first character string input section 14, first character string memory 15, matrix forming section 16, matrix memory 17, comparing/voting section 18, voting result calculating section 19, calculated value memory 20, matching determination section 21, matching result output section 22, noise removing section 23, and adjacent calculating section 24.

In the matching character string data base 11, candidates of second character strings are stored.

To the second character string input section 12, the candidate of a second character string (second pattern string) is input from the matching character string data base 11. The input second character string is stored into the second character string memory 13.

To the first character string input section 14, a recognized character string (first pattern string) derived based on the character candidates obtained by the character recognizing section 5 is input. The input first character string is stored in the first character string memory 15.

The matrix forming section 16 forms a matrix corresponding to the second character string and the first character string and stores the same into the matrix memory 17. The matrix is formed by arranging the characters (patterns) of the second character string on a row as the abscissa and arranging the characters (patterns) of the first character string on a column as the ordinate in the matrix memory 17. That is, when the number of characters constituting the first character string is m and the number of characters constituting the second character string is n, then a matrix of m rows and n columns is formed in the matrix memory 17.

Figure 3:
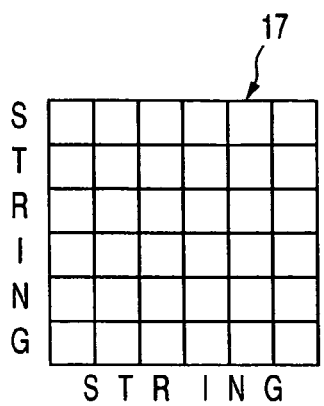
FIG. 3 is a diagram showing an example of a matrix.

For example, as shown in FIG. 3, if a second character string of "STRING" is subjected to the matching process with respect to a first character string of "STRING", a matrix of 6 rows and 6 columns including the rows for the respective characters of "STRING" as the first character string and the columns for the respective characters of "STRING" as the second character string is formed in the matrix memory 17.

The comparing/voting section 18 compares the respective characters of the first character string with the characters of the second character string and determines whether or not the compared characters are matched. If the compared characters are matched, the comparing/voting section 18 votes for a position in which the row and column corresponding to the matched characters of the first character string and the second character string of the matrix formed in the matrix memory 17 intersect each other. As the voting operation, a value corresponding to the degree of similarity of the character of the first character string may be voted.

Figure 4:
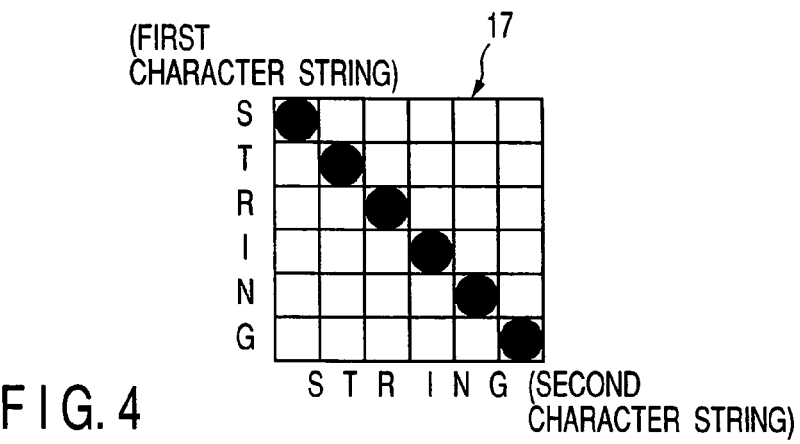
FIG. 4 is a diagram showing an example of voting for a matrix.

For example, as shown in FIG. 4, when the second character string "STRING" and the first character string "STRING" are subjected to the matching process, "S" of the first character string is matched with "S" of the second character string. Therefore, the comparing/voting section 18 votes for a position in which the first row and the first column of the matrix intersect. Likewise, the comparing/voting section 18 votes for positions in which characters of the first character string respectively matching with the characters "T", "R", "I", "N", "G" of the second character string intersect the corresponding characters of the second character string, that is, the second row and the second column, the third row and the third column, the fourth row and the fourth column, the fifth row and the fifth column, the sixth row and the sixth column intersect each other.

The voting result calculating section 19 makes calculation in an oblique direction of the matrix voted by the comparing/voting section 18. In the voting result calculating section 19, preset calculations are made by use of components in the oblique direction of the matrix. For example, after the comparing/voting section 18 votes for the matrix, the voting result calculating section 19 makes preset calculation for each projected component in the oblique direction of 45 degrees with respect to the row of the matrix and stores the calculated values in the calculated value memory 20.

Further, the voting result calculating section 19 forms a line segment for storing the calculated values into the calculated value memory 20 when the calculated values are stored into the calculated value memory 20. If the length of the first character string (the number of characters of the first character string) is expressed by SEARCHLEN and the length of the second character string (the number of characters of the second character string) is expressed by DICLEN, the length (the number of calculated values) of the line segment becomes (DICLEN+SEARCHLEN−1). The line segment corresponds to a line segment extending in a diagonal direction from the lower left portion to the upper right portion of the matrix if the first character string and second character string have the same length (the same number of characters). In the line segment, calculated values of the result of voting for positions in a lower right oblique direction are stored.

The matching determination section 21 determines a score indicating the degree of matching between the first character string and the second character string based on the calculated values stored in the calculated value memory 20. Further, the matching determination section 21 determines whether or not the first character string and second character string are matched with each other based on the determined score and outputs the matching result via the matching result output section 22.

As will be described later, the noise removing section 23 is to eliminate noise from the first character string when it is determined that noise is contained in the first character string.

As will be described later, the adjacent calculating section 24 makes calculation for a value in the peak position in the calculated values stored in the calculated value memory 20 and a value in a position adjacent to the peak position.

Next, the calculated value of the result of voting for the matrix is explained.

In a case where all of the characters of the first character string coincide with the characters of the second character string in the same positions, votes are cast only for components in positions of n-th row and n-th column of the matrix. Therefore, if the voting result calculating section 19 makes calculation in the oblique direction of the matrix, calculated values containing large values only in the intermediate position of the line segment are stored in the calculated value memory 20.

Figure 5:
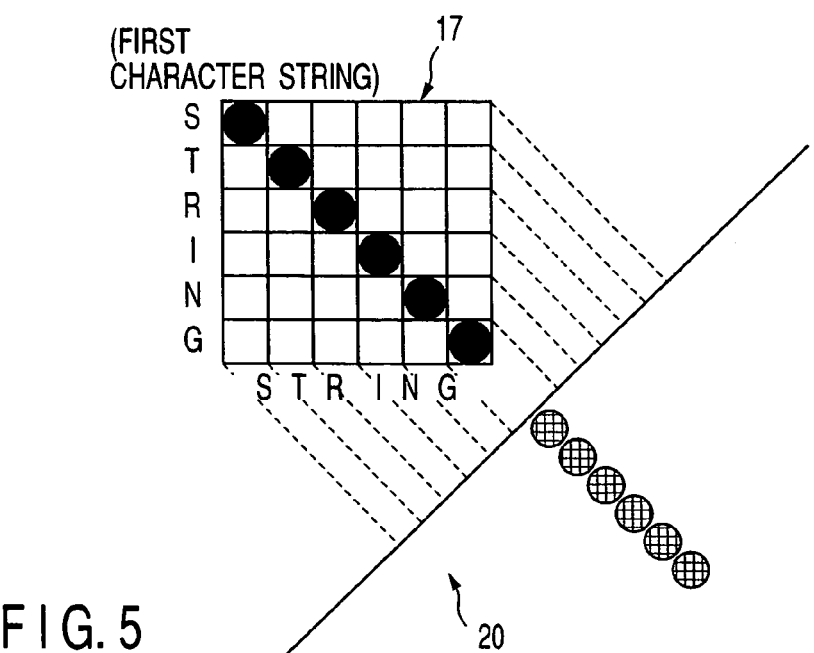
FIG. 5 is a diagram showing an example in a case where a projection image of the matrix is obtained.

For example, as shown in FIG. 5, in the case of the second character string "STRING" and the first character string "STRING", all of the characters of the first character string coincide with the characters of the second character string in the same positions. Therefore, votes are cast only for components of the first row and the first column, the second row and the second column, the third row and the third column, the fourth row and the fourth column, the fifth row and the fifth column, the sixth row and the sixth column in the matrix. As a result, if the voting result calculating section 19 makes calculation for components in a direction from the upper left portion to the lower right portion (oblique direction) of the matrix, calculated values of the voting result become large only in the central position of the line segment. For example, in the case of the second character string and the first character string shown in FIG. 5, the calculated value of the voting result becomes six in the intermediate position of the line segment if the number of votes for each component is one and the projected image in the oblique direction of the matrix is taken. The value is the same as the length of the second character string.

In a case where the positions of the characters of the first character string are different from the positions of the characters of the second character string even if each character of the second character string coincides with the corresponding character of the first character string, only the calculated value in the intermediate position of the line segment in the calculated value memory 20 will not be large.

Figure 6:
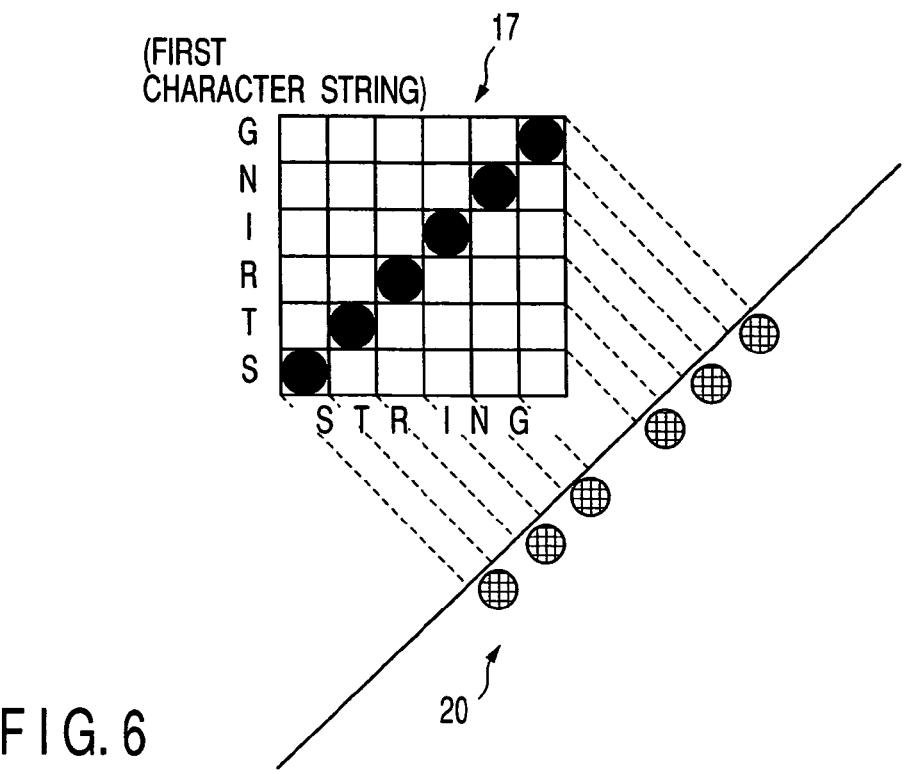
FIG. 6 is a diagram showing an example in a case where a projection image of the matrix is obtained.

For example, as shown in FIG. 6, in the case of the second character string "STRING" and the first character string "GNIRTS", all of the characters of the first character string coincide with the characters of the second character string, but the positions of the characters of the first character string are different from the positions of the characters of the second character string. Therefore, votes are cast for components of the sixth row and the first column, the fifth row and the second column, the fourth row and the third column, the third row and the fourth column, the second row and the fifth column, the first row and the sixth column in the matrix. As a result, if the voting result calculating section 19 makes calculation for components in a direction from the upper left portion to the lower right portion (oblique direction) of the matrix, calculated values of the voting result are evenly distributed over the whole portion of the line segment.

That is, as shown in FIG. 6, for example, if the projected image is taken in an oblique direction of the matrix, the calculated values of the voting result are not concentrated in the intermediate position of the line segment and are distributed over the whole portion of the line segment.

Next, a case wherein the matching process is effected by use of the matrix without taking noise into consideration is explained. In the following explanation, as an example of calculations in the oblique direction of the matrix relating to the voting result, a case wherein the projected image of votes is taken is explained.

If the first character string does not contain noise, the length (the number of characters) SEARCHLEN of the first character string and the length (the number of characters) DICLEN of the second character string which are matched with each other are the same (the same number of characters). In this case, the voting result calculating section 19 forms a line segment with the length (the number) of (DICLEN+SEARCHLEN−1) in the calculated value memory 20.

The line segment (projected line segment) corresponds to components in a diagonal direction from the lower left portion to the upper right portion of the matrix. The voting result calculating section 19 makes calculation for the line segment formed in the calculated value memory 20 for each component in the lower right oblique direction.

Further, if no noise is attached to the front or rear portion of the first character string, PROJLEN=DICLEN+SEARCHLEN−1 if the length of the projected line segment is PROJLEN. In this case, masses (positions in which the calculated values are stored) of (DICLEN−1) are provided on both sides of the peak position of the projected line segment.

Figure 7:
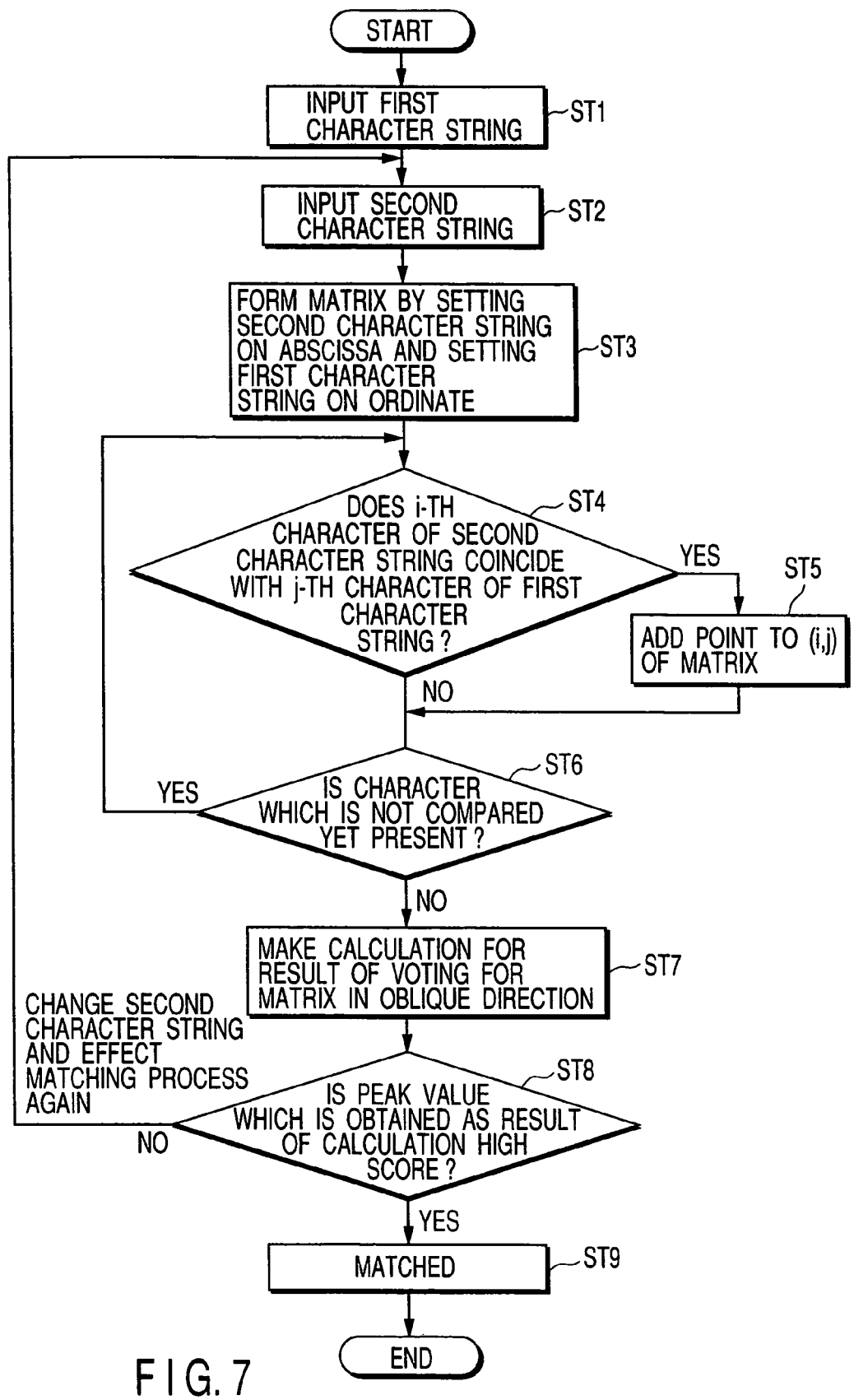
FIG. 7 is a flowchart for illustrating the matching process in a case where no noise is taken into consideration.

Next, the matching process by use of the matrix without taking noise into consideration is explained with reference to the flowchart shown in FIG. 7.

The first character string input section 14 inputs a first character string (step ST1) and stores the same into the first character string memory 15. The second character string input section 12 inputs a second character string from the character string matching dictionary 11 (step ST2) and stores the same into the second character string memory 13. Then, the matrix forming section 16 forms a matrix having the second character string arranged on the abscissa and the first character string arranged on the ordinate in the matrix memory 17 (step ST3). The thus formed matrix is constructed by rows corresponding to the characters of the first character string and columns corresponding to the characters of the second character string.

If the matrix is formed, the comparing/voting section 18 determines whether or not the characters of the first character string are matched with the characters of the second character string. That is, if the number of characters of the first character string is m and the number of characters of the second character string is n, then the comparing/voting section 18 sequentially determines whether or not the i-th (i=1 to m) character of the first character string is matched with the j-th (j=1 to n) character of the second character string (step ST4).

If it is determined by the comparing/voting section 18 that the i-th character of the first character string is matched with the j-th character of the second character string, the comparing/voting section 18 votes for the component of the i-th row and j-th column of the matrix in the matrix memory 17 (step ST5).

It is possible to cast a vote when one of the candidates of the character is matched in a case where a plurality of candidates of the recognized character in the character recognition of the first character string are provided. Further, weighted values based on the degree of similarity of the recognized character or the priority order of the candidate of the recognized character in the character recognition of the first character string may be voted. In addition, it is possible not to cast a vote when the degree of similarity of the recognized character in the character recognition of the first character string is smaller than a preset reference value.

After the voting operation or when it is determined in the step ST3 that the character is not matched, whether or not a combination of the characters which are not yet compared is present is determined (step ST6). If it is determined in the step ST6 that a combination of the characters which are not yet compared is present, the process returns to the step ST4 to effect the same process for the new combination.

When it is determined that all of the characters are compared, the voting result calculating section 19 makes preset calculation in an oblique direction of the matrix obtained as the voting result (step ST7). At this time, the voting result calculating section 19 forms a line segment with the length (the number) corresponding to the components in the oblique direction of the matrix in the calculated value memory 20. In the line segment formed in the calculated value memory 20, the result of calculation is stored.

If the calculated value of the voting result is stored in the calculated value memory 20, the matching determination section 21 calculates a score indicating the degree of matching between the second character string and the first character string based on the value stored in the calculated value memory 20.

For example, the score obtained in the matching determination section 21 is calculated as the degree of similarity. In this case, the peak value of the values stored in the calculated value memory 20 is normalized by use of the length of the second character string or the length of the first character string and the normalized peak value is used as the degree of similarity of matching of the character string. The degree of similarity becomes higher as the second character string and the first character string are closer to each other.

The matching determination section 21 determines whether or not the score based on the peak value of the values stored in the calculated value memory 20 is large (step ST8). The process for determining whether the score is large or not may be effected according to whether or not the score is larger than a preset score or based on the result of comparison with a score of matching with a candidate of another second character string.

If the score is determined to be large, the matching determination section 21 determines that the second character string and the first character string are matched with each other and outputs the matching result (step ST9).

If the matching determination section 21 determines that the score is not large, the second character string is changed and the process returns to the step ST2 to effect the similar process again.

As described above, votes are cast for the matrix having the second character string and the first character string as two sides and calculation is made in the oblique direction of the voted matrix. Then, whether or not the characters are matched is determined according to the score based on the peak value obtained as the result of the calculation.

Thus, the matching process with the arrangement of the character string taken into consideration can be effected by the simple voting operation and it is possible to prevent the characters from being determined to be matched when the positions of the characters of the first character string and the positions of the characters of the second character string are different from each other.

Next, the matching process using the matrix in a case where noise is attached to the front or rear portion of the first character string is explained.

Figure 8:
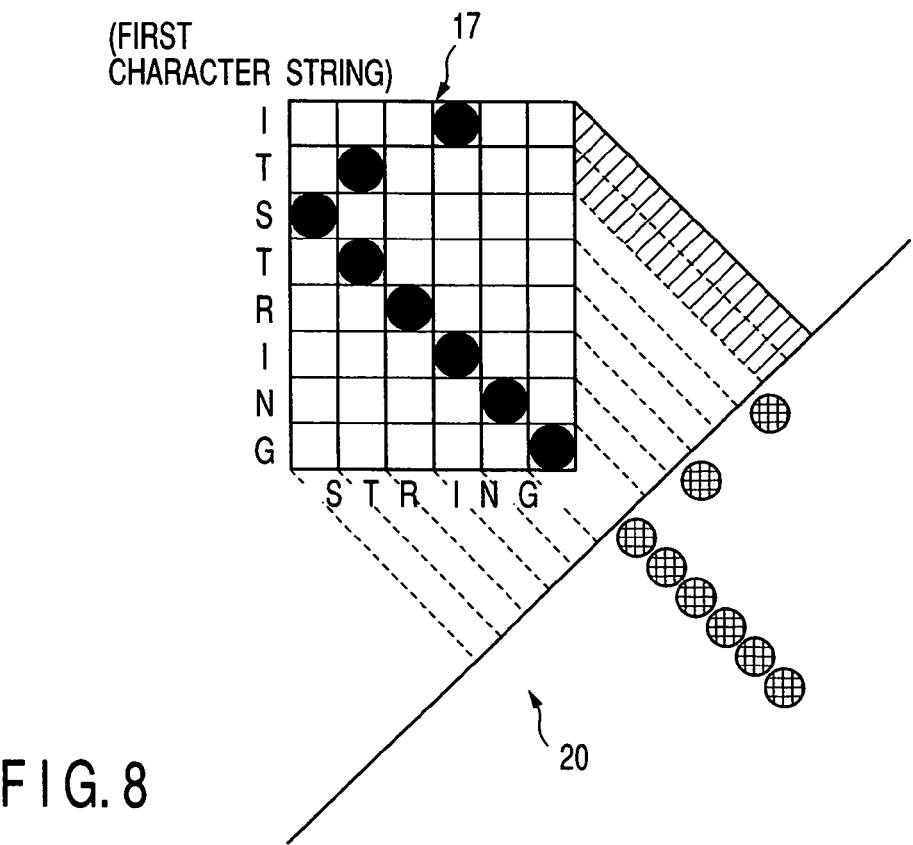
FIG. 8 is a diagram showing an example of voting in a case where noise is attached to the front portion of a first character string.

FIG. 8 illustrates the matching process for the first character string in which noise of two characters of "IT" is attached to the front portion of the character string "STRING". That is, FIG. 8 shows a matrix formed, the voting result for the matrix and the projection result of the matrix when the first character string is "ITSTRING" and the second character string is "STRING".

In this case, since the lengths of the first character string and the second character string are different from each other, the matrix forming section 16 forms a matrix having a longer longitudinal side (the number of rows is larger than the number of columns) corresponding to the first character string in the matrix memory 17.

"I" and "T" as noise in the first character string "ITSTRING" are matched with "I" and "T" contained in the second character string "STRING". Therefore, the comparing/voting section 18 votes for positions of the matrix in which rows for "I" and "T" as the noise in the first character string and columns for "I" and "T" in the second character string intersect each other.

The matrix corresponding to the first character string "ITSTRING" and the second character string "STRING" and formed by the matrix forming section 16 has eight rows and six columns and the number of rows is larger than the number of columns. Therefore, a line segment with the length (the number) of (DICLEN+SEARCHLEN−1=13) is formed in the calculated value memory 20 as shown in FIG. 8. Values stored in the line segment correspond to calculated values for the components projected to a line segment of 45 degrees with respect to the row direction of the matrix. For example, as shown in FIG. 8, when the projected image of the matrix is taken, the voting result calculating section 19 calculates the projected image of the line segment for components in a direction passing through the eighth row and the first column and the third row and the sixth column.

Thus, calculated values of the voting result for the components in a lower right oblique direction of the matrix are stored in the line segment formed in the calculated value memory 20. The values stored in the calculated value memory 20 with the position of the peak value thereof deviated from the center of the line segment are obtained. This is because the characters of the length (the number) treated as noise are attached to the first character string so as to make the first character string longer than the second character string and a portion corresponding to the noise appears on the line segment used as the calculated values of the voting result. Therefore, when the first character string having noise attached to the front or rear portion thereof is matched with the second character string, the noise contained in the first character string can be determined based on the calculated values of the voting result.

That is, the number of noises and the front portion or rear portion of the first character string to which the noise is attached can be determined based on the length from the position of the peak value to both ends in the line segment as the calculated values of the voting result.

In a case where the length from the peak position to the left end portion in the line segment as the calculated values of the voting result is larger than (DICLEN−1), the noise is determined to be attached to the front side of the first character string. Further, if the length from the peak position to the right end portion is larger than (DICLEN−1), the noise is determined to be attached to the rear side of the first character string.

For example, when a projection image of the matrix in the oblique direction is taken as the calculated values of the voting result, the number NHEAD of noises attached to the front portion (head) of the first character string is expressed as follows if the length of the projected line segment is PROJLEN, the length of the projected line segment from the lower left portion to the peak position is PEAKLEN, and the length of the second character string is DICLEN.

$$NHEAD=PROJLEN-PEAKLEN-(DICLEN-1)$$

The number NTAIL of noises attached to the rear portion (tail) of the first character string is expressed as follows.

$$NTAIL=(PEAKLEN-1)-(DICLEN-1)$$

As described above, in a case where the noises are attached to the front or rear portion of the first character string, the number of noises can be determined based on the length from the peak value position to the end portion of the line segment as the calculated values of the voting result. Further, whether the noise is attached to the front or rear portion of the first character string can be determined according to whether the length from the peak value position to the right end portion or the left end portion is larger than (DICLEN−1).

Figure 9:
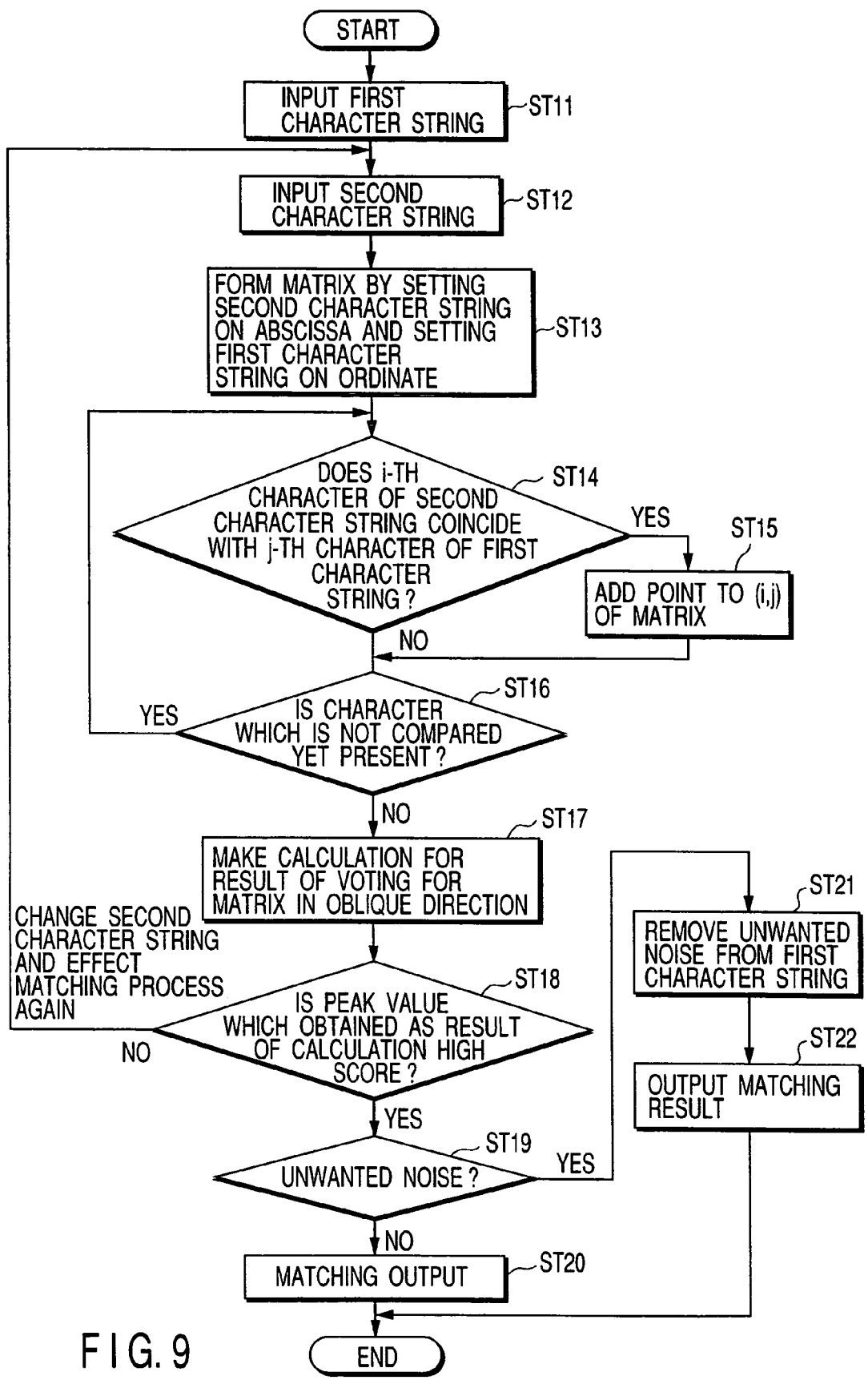
FIG. 9 is a flowchart for illustrating a matching process in a case where noises are attached to the front portion and rear portion of the first character string.

Next, the matching process effected when noise is attached to the front or rear portion of the first character string is explained with reference to the flowchart shown in FIG. 9.

Like the process of the steps ST1 to ST8, the first character string input section 14 and second character string input section 12 respectively store a first character string and second character string into the first character string memory 15 and second character string memory 13 (steps ST11, ST12). The matrix forming section 16 forms a matrix having the second character string as the abscissa and the first character string as the ordinate in the matrix memory 17 (step ST13).

The comparing/voting section 18 determines whether or not the characters of the first character string are matched with the characters of the second character string for each character and votes for the matrix when they are matched with each other (steps ST14, ST15, ST16).

When the process for comparing all of the combinations of characters is completed, the voting result calculating section 19 makes calculation in an oblique direction of the matrix obtained as the voting result (step ST17). The calculated values are stored in a line segment formed in the calculated value memory 20. The matching determination section 21 determines whether or not a score based on the peak value is a large score based on the calculated values stored in the calculated value memory 20 (step ST18). If it is determined that the score based on the peak value is not a large score, the second character string is changed and the process returns to the step ST12 to effect the process again.

On the other hand, if it is determined that the score based on the peak value is a large score, the noise removing section 23 counts the lengths from the peak position of the line segment as the calculated values stored in the calculated value memory 20 to the right and left end portions. The noise removing section 23 determines whether unwanted noise (the calculated value on the line segment for noise) is present in the front or rear portion of the first character string according to whether or not the counted lengths are longer than (the length of the second character string−1 (DICLEN−1)) (step ST19). That is, if the lengths from the peak value from to the end portions are both (DICLEN−1), it is determined that unwanted noise is not present and if the length from the peak value from the end portion is longer than (DICLEN−1), it is determined that the unwanted noise is present.

If it is determined that the unwanted noise is not present, the noise removing section 23 outputs the matching result obtained by the matching determination section 21 (step ST20).

If it is determined that the unwanted noise is present, the noise removing section 23 removes characters of a number corresponding to the number of unwanted noises from the front or rear end portion of the first character string (step ST21) and outputs the remaining portion as the matching result (step ST22). At this time, the noise removing section 23 removes a portion with the length by which the length from the peak position to the end portion is larger than (DICLEN−1) from the corresponding end portion. As a result, the noise attached to the front or rear end portion of the first character string can be removed.

As described above, a vote is cast for a position in which the row of a character and the column of the same character intersect in the matrix corresponding to the first character string and second character string and calculation is made in an oblique direction. Then, the position of the peak value is determined based on the calculation result and the matching result is determined based on the peak value. Further, the presence or absence of noise is determined according to whether or not the length from the position of the peak value to the right or left end portion is larger than (the length of the second character string−1).

Thus, even when noise is contained in the first character string, the highly precise matching process can be effected and the presence or absence of noise in the first character string can be determined.

If it is determined that noise is present, it is determined that the noise is contained in one of two portions with the lengths (the numbers) from the projected peak position to the projected two end portions whose length is larger than (the length of the second character string−1) and a portion of the length by which the length from the peak position to the end portion is larger than (DICLEN−1) is determined as noise and removed from the corresponding end portion.

As a result, the remaining portion from which the noise has been removed can be output as the matching result and the matching precision can be enhanced.

Next, the matching process using the matrix in a case where noise is contained in the first character string is explained.

Figure 10:
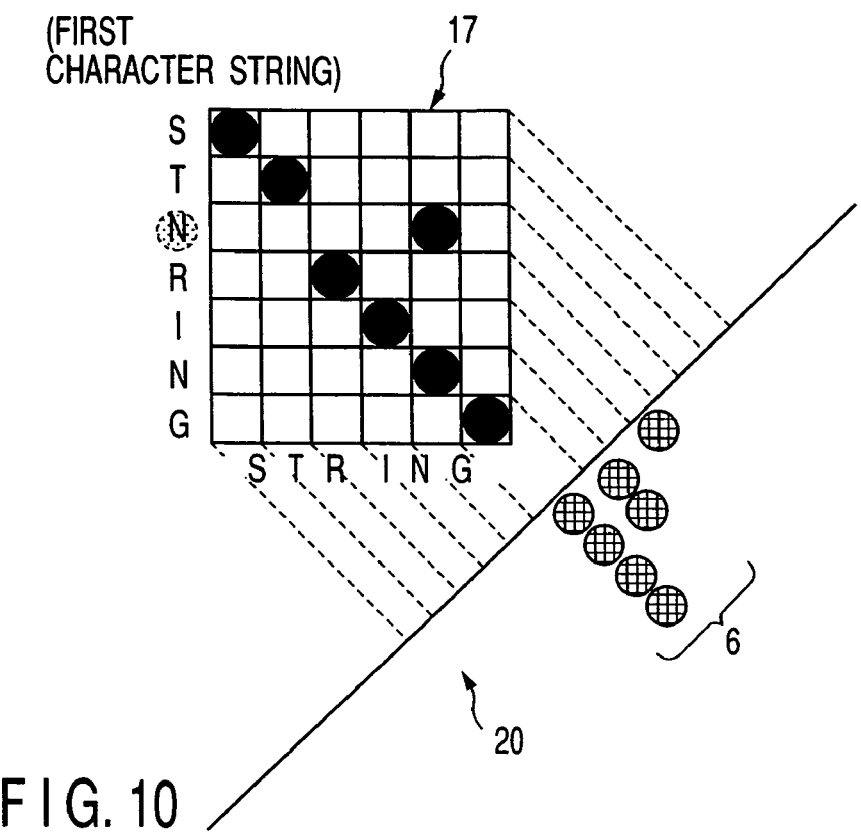
FIG. 10 is a diagram showing an example of voting in a case where noise is attached in a portion inside the first character string.

FIG. 10 illustrates a matching process in a case of the first character string which has noise of "N" attached between characters of the character string "STRING". That is, FIG. 10 shows a matrix, the voting result for the matrix and the calculated values of the voting result in a case where the first character string is "STNRING" and the second character string is "STRING".

In this case, since the lengths of the first character string and the second character string are different from each other, the matrix forming section 16 forms a matrix in which the number of rows corresponding to the first character string is larger than the number of columns corresponding to the second character string in the matrix memory 17 like the case wherein noise is attached to the front or rear end portion.

"N" of noise in the first character string "STNRING" matches with "N" in the second character string "STRING". Therefore, the comparing/voting section 18 votes for a position of the matrix in which the row corresponding to "N" in the first character string and the column corresponding to "N" in the second character string intersect each other.

In this case, the matrix is formed with the seven rows and six columns as shown in FIG. 10. Therefore, in the calculated value memory 20, a line segment with the length of (DICLEN+SEARCHLEN−1=12) is formed. Values stored in the line segment correspond to calculated values of components projected to the line segment which is inclined at 45 degrees with respect to the row direction of the matrix. For example, as shown in FIG. 10, when the projected image of the matrix is taken, the voting result calculating section 19 calculates the projected image of the line segment for the components arranged in a direction passing through a position of the seventh row and first column and a position of the second row and sixth column.

Thus, in the line segment formed in the calculated value memory 20, calculated values of the voting result for the lower right oblique direction of the matrix are stored. For example, if the voting value is "1" and the projected image of the matrix is taken, the voting result that the number of votes (peak value) in the peak position is four is obtained in the calculated value memory 20 as shown in FIG. 10. The peak value is smaller than "6" which is the length (the number) of the second character string. This is because the position on the projected line segment is shifted by one character before and after the noise attached between the characters of the first character string.

Further, in an example of FIG. 10, the peak value of a portion corresponding to the character string after occurrence of the noise becomes "4" and the number of votes for the upper right position adjacent to the peak position of a portion corresponding to the character string before occurrence of the noise appears as "2". Therefore, the total sum of the number of votes for the peak position and the number of votes for the position adjacent to the peak position coincides with the number of votes (the number of characters of the second character string) obtained in a case where the characters of the first character string are matched with the respective characters of the second character string.

That is, if only one noise is permitted to be contained in the first character string, the adjacent calculating section 24 makes preset calculation (re-calculation) based on the calculated value in the peak position in the line segment of the calculated values of the voting result and the calculated value in a position adjacent to the peak position. If the calculated value in the adjacent position is a large score, it is determined that the first character string is matched with the second character string. At this time, it is determined that one noise is inserted into the first character string.

For example, as shown in FIG. 10, in a case where the projected image of the matrix is taken as the calculated values of the voting result, the number "4" of votes in the peak position is added together with the number "2" of votes in the adjacent position if only one noise is permitted to be inserted between the characters of the first character string. As a result, the number of votes in the peak position and in the position adjacent to the peak position becomes "6" and coincides with the number of characters of the second character string.

If the permissible range of the number of noises which can be contained in the first character string is increased, the adjacent calculating section 24 makes preset re-calculation based on the calculated values in a position near the peak position by the number of times corresponding to the number of noises in the permissible range. Thus, the matching process can be effected according to the number of permitted noises with the arrangement of the character string taken into consideration.

As described above, when a preset number of noises which can be inserted between the characters of the first character string is permitted, re-calculation is made by use of the values in the peak position of the line segment as the calculated value of the voting result and in the position near the peak position based on the number of permitted noises and the degree of matching is determined based on the calculated values.

Thus, even when noise is contained between the characters of the first character string, the highly precise matching process can be effected with the arrangement of the character string taken into consideration.

Figure 11:
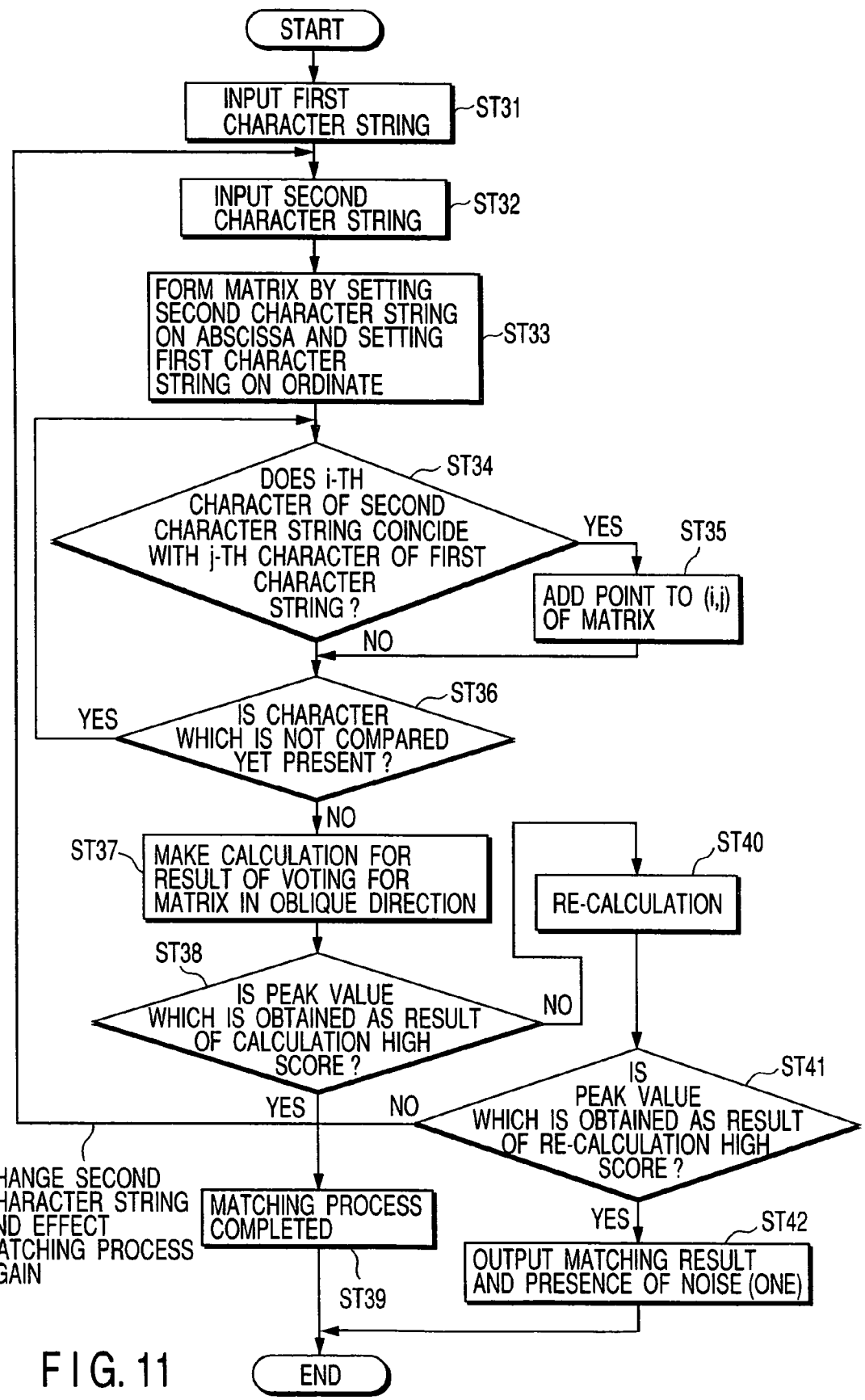
FIG. 11 is a flowchart for illustrating a matching process in a case where noise is attached in a portion inside the first character string.

Next, the matching process effected when noise is contained between the characters of the first character string as described above is explained with reference to the flowchart shown in FIG. 11.

Like the process of the steps ST1 to ST8, the first character string input section 14 and second character string input section 12 respectively store a first character string and second character string into the first character string memory 15 and second character string memory 13 (steps ST31, ST32). The matrix forming section 16 forms a matrix having the second character string as the abscissa and the first character string as the ordinate in the matrix memory 17 (step ST33).

The comparing/voting section 18 determines whether or not the characters of the first character string are matched with the characters of the second character string for each character and votes for the matrix when they are matched with each other (steps ST34, ST35, ST36).

When the process for comparing all of the combinations of characters is completed, the voting result calculating section 19 makes calculation in an oblique direction of the matrix obtained as the voting result (step ST37). The calculated values are stored on a line segment formed in the calculated value memory 20. The matching determination section 21 determines whether or not a score based on the peak value is a large score based on the calculated values stored in the calculated value memory 20 (step ST38).

If it is determined that the score based on the peak value is a large score, the matching determination section 21 outputs the matching result (step ST39).

If it is determined that the score based on the peak value is not a large score, the adjacent calculating section 24 makes preset calculation (re-calculation) by use of values in the peak position and in a position adjacent thereto (step ST40). Thus, the matching determination section 21 determines whether or not the calculated value by the re-calculation is a large score (step ST41). If it is determined that the calculated value is not a large score, the second character string is changed and the process returns to the step ST32 to effect the process again.

On the other hand, if it is determined that the calculated value obtained by re-calculating the values in the peak position and in the position adjacent thereto is a large score, the matching determination section 21 outputs a matching result indicating that the first character string is matched with the second character string. At this time, the matching determination section 21 outputs a signal indicating that the noise is contained in the first character string together with the matching result (step ST42).

If it is determined that the characters are matched based on re-calculation by use of the values in the peak position and in the position adjacent thereto, it is also possible to determine the position of the noise contained in the first character string. In this case, a character which is not voted for the peak position or a position adjacent to the peak position to be re-calculated is determined as noise.

As described above, a vote is cast for a position in which the same characters lying on the abscissa and ordinate intersect each other in the matrix of the first character string and the second character string and calculation of the voting result in an oblique direction is made. The peak position is determined based on the line segment obtained as the result of calculation and the matching result is determined based on the value in the peak position. When it is determined by the determination result that the value in the peak position does not indicate the matching state, re-calculation is made based on the value in the peak position and the value in a position adjacent to the peak position and the matching result is determined based on the re-calculated value.

As a result, even when noise is contained between the characters of the first character string, a highly precise matching process can be realized and the presence or absence of noise in the first character string can be determined.

Next, a case wherein a vote is directly cast for a line segment in which calculated values of the voting result are stored without voting for the matrix is explained.

Figure 12:
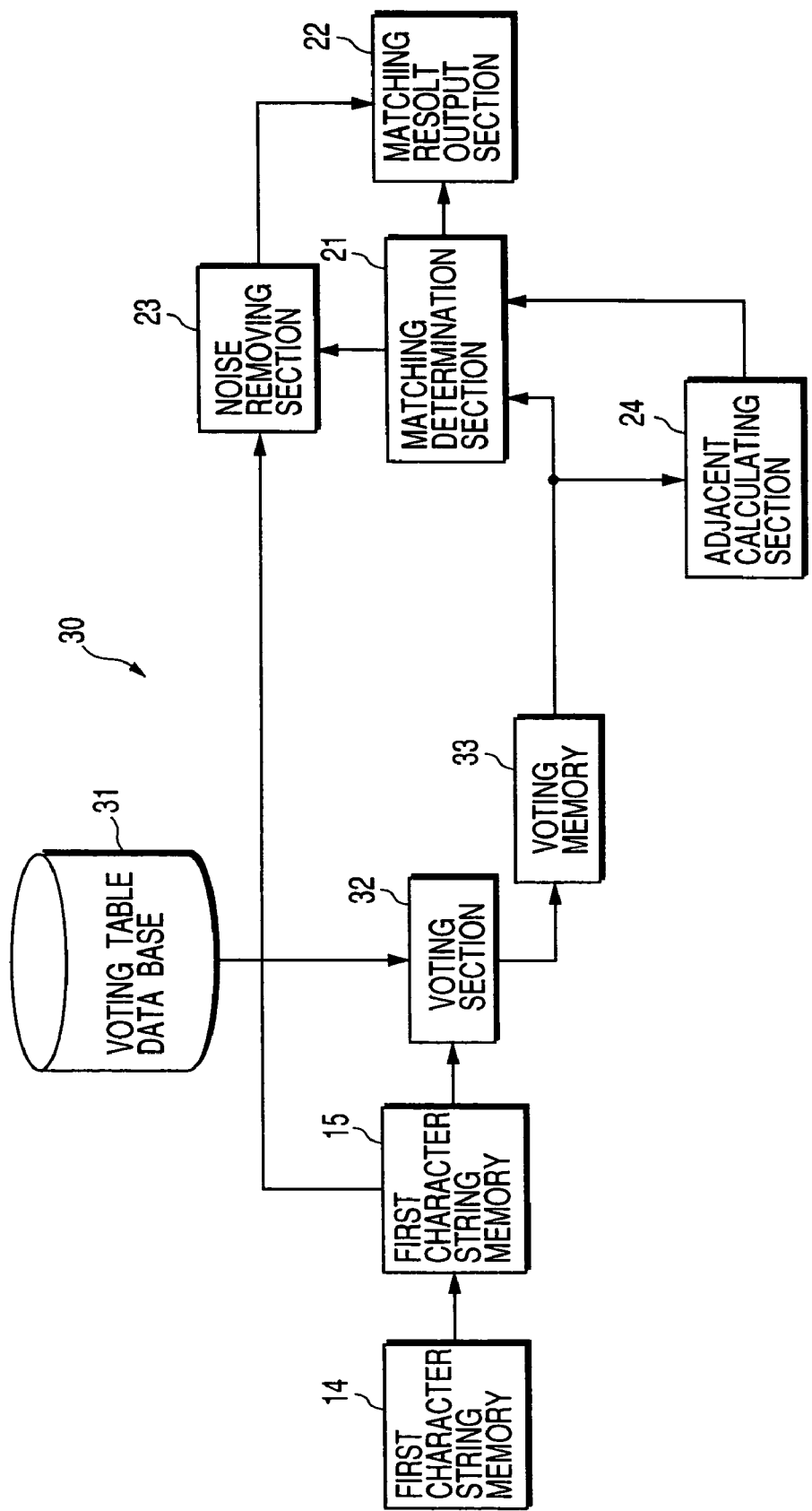
FIG. 12 is a block diagram showing an example of another construction of a character string matching processing section.

FIG. 12 is a diagram schematically showing the construction of a character string matching processing section 30 in a case wherein a vote is directly cast for a line segment in which calculated values of the voting result are stored.

As shown in FIG. 12, the character string matching processing section 30 includes a first character string input section 14, first character string memory 15, voting table data base 31, voting section 32, voting memory 33, matching determination section 21, matching result output section 22, noise removing section 23, and adjacent calculating section 24.

The voting table data base 31 stores second character strings.

The voting section 32 votes for the voting memory 33 based on the first character string stored in the first character string memory 15 and the second character string stored in the voting table data base 31.

Next, the matching process effected by use of the character string matching processing section 30 with the construction as described above is explained. The character string matching processing section 30 directly casts a vote for the voting memory 33 according to the positional relation between the characters of the first character string and the characters of the second character string without forming a matrix and determines the matching result.

In the voting memory 33, a line segment with the length (the number) corresponding to the length (the number of characters) of the first character string and the length (the number of characters) of the second character string is formed. The length of the line segment formed in the voting memory 33 corresponds to the length of components in a lower right oblique direction of a matrix having the first character string as the abscissa and the second character string as the ordinate. The components in the oblique direction of the matrix are voted for corresponding positions of the line segment on the voting memory 33.

Voted values are accumulated in the line segment on the voting memory 33 to which positions in the oblique direction of the matrix correspond. At this time, the values accumulated on the line segment are subjected to preset calculation for each vote by the voting section 32 and the result of calculation is stored into the voting memory 33. As a result, when the voting operation is completed, values corresponding to the line segment can be directly obtained in the voting memory 33 as the calculated values of the voting result on the calculated value memory 22 for the result of voting for the matrix without voting for the matrix.

If the length of the first character string is "SEARCHLEN" and the length of the second character string is "DICLEN", the number of components in the lower right oblique direction of the matrix having the first character string as the abscissa and the second character string as the ordinate becomes (SEARCHLEN+DICLEN−1). Therefore, in the voting memory 33, voting positions of the length of (SEARCHLEN+DICLEN−1) are prepared.

If the SEARCHP-th character of the first character string and the DICP-th character of the second character string are matched with each other, a position POS in which a vote is cast for the voting memory 33 is as follows.

$$POS=(SEARCHP-DICP)+(DICLEN-1)$$

The voted position POS is a position on the voting memory 33 to which the component of the SEARCHP-th row and DICP-th column of the matrix having the first character string as the abscissa and the second character string as the ordinate corresponds.

For example, when the first character string "STRING" and the second character string "STRING" are subjected to the matching process, a line segment with the length of (SEARCHLEN+DICLEN−1=11) is prepared as the voting positions in the voting memory 33.

Figure 13:
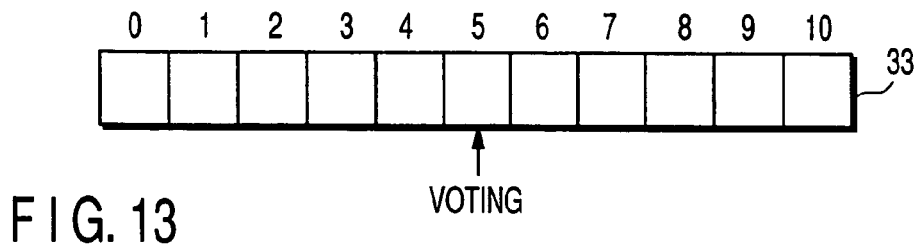
FIG. 13 is a diagram showing an example of voting in a voting memory.

In a case wherein the voting positions of the voting memory 33 are indicated as 0, 1, 2, . . . , 10 from the right as shown in FIG. 13 and if the i-th character of the first character string and the j-th character of the second character string are the same, a vote is cast for the ((j−i)+(DICLEN−1))-th voting position of the voting memory 33.

For example, "T" which is the second character of the first character string is matched with "T" which is the second character of the second character string. In this case, a vote is cast for the fifth position (POS=(2−2)+(6−1)=5) of the voting memory 33.

Figure 14:
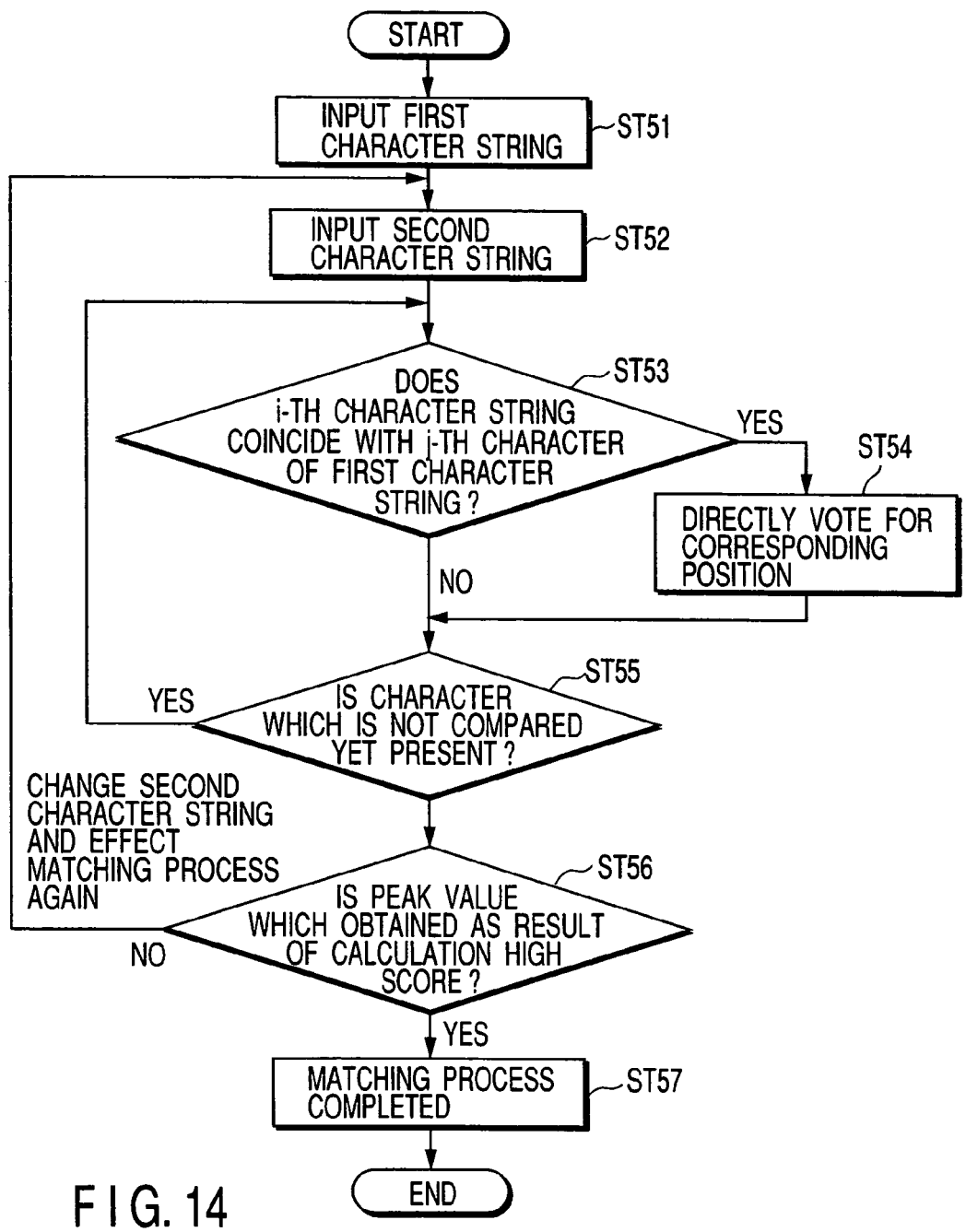
FIG. 14 is a flowchart for illustrating a matching process in a case where a vote is directly cast into the voting memory.

FIG. 14 is a flowchart for illustrating a matching process in a case where a vote is directly cast for the voting memory 33 as the projected line segment.

That is, the first character string input section 14 inputs the first character string (step ST51) and stores the same into the first character string memory 15. On the other hand, the second character string input section 12 inputs the second character string from the matching character string data base 11 (step ST52) and stores the same into the second character string memory 13.

Then, the voting section 32 determines whether or not the i-th (i=1 to m) character of the first character string and the j-th (j=1 to n) character of the second character string are the same character (step ST53) when the number of characters of the first character string is m and the number of characters of the second character string is n. At this time, the voting section 32 prepares voting positions with the length of (m+n−1) for the voting memory 33.

When the voting section 32 determines that the i-th character of the first character string and the j-th character of the second character string are the same character, the voting section 32 directly votes for a voting position of the voting memory 33 indicated by POS=(i−j)+(n−1) according to the above equation (step ST54). At this time, like the case of the voting operation for the matrix described before, the voting operation for the voting memory 33 may be effected by voting weighted values based on the degree of similarity of the recognized character or the priority order of the candidate of the recognized character when the first character string is constructed by recognized characters obtained by character recognition.

When a vote is cast, the voting section 32 makes preset calculation by use of a value to be voted and a value already stored in the voting memory 33 to rewrite a value to be stored into the voting memory 33.

When the process for comparing all of the combinations of characters is completed (step ST55), the matching determination section 21 determines the degree of matching between the first character string and the second character string based on the value of the voting result stored in the voting memory 33 (steps ST56, ST57).

In this case, the matching determination section 21 may determine the presence or absence of noise in the front or rear portion of the first character string based on the voting result as in the steps ST18 to ST22 or determine the presence of noise contained between characters of the first character string as in the steps ST38 to ST42.

As described above, the matching degree is determined by directly casting votes for a line segment to which components in an oblique direction of the matrix having the first character string on the abscissa and the second character string on the ordinate correspond.

As a result, the efficiency of the matching process for the first character string and the second character string is enhanced and the processing speed is enhanced.

Figure 15:
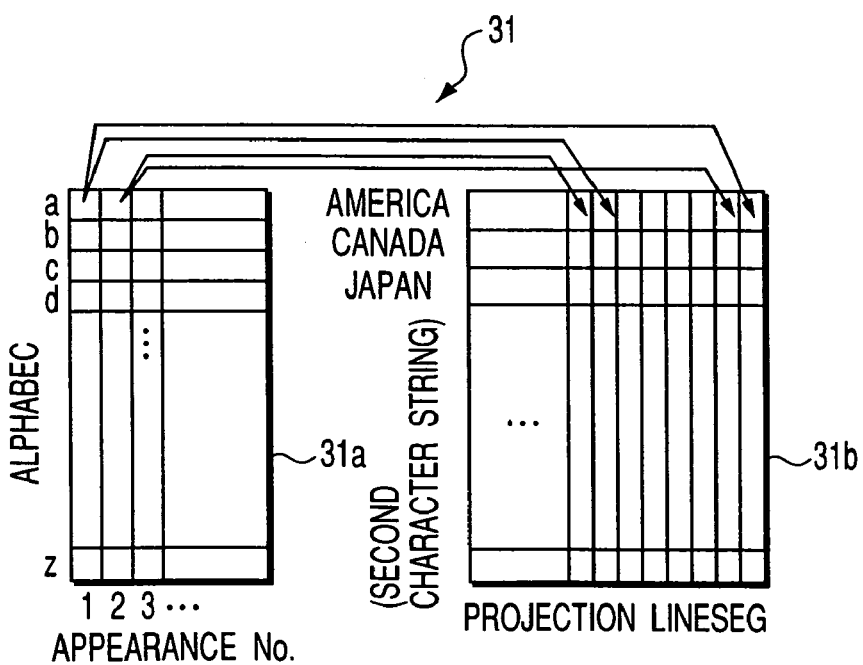
FIG. 15 is a diagram showing an example of a voting table data base.

Next, the matching process for directly voting for a projected line segment by table lookup by use of the voting table data base 31 as shown in FIG. 15 is explained.

As shown in FIG. 15, the voting table data base 31 is prepared. The voting table data base 31 has two tables. As shown in FIG. 15, a left table (first table) 31a is provided for the first character string and a right table (second table) 31b is provided for the second character string.

For example the left table 31a has characters (types of patterns) corresponding to the character type such as "a" to "z" in the case of alphabet on the ordinate and the order of characters appearing in the first character string (the positions of characters from the head of the first character string) from the first order to the last possible order on the abscissa.

The right table 31b has the second character string on the ordinate and a projected line segment corresponding to the second character string on the abscissa. The abscissa provided for the second character string corresponds to the calculated value memory 20 or voting memory 33.

Corresponding portions in the left table 31a and right table 31b are connected to each other via links. That is, the position of the line segment of each second character string in the right table 31b is set to correspond to a character specified in the left table 31a and the appearance order thereof. For example, in FIG. 15, the first position of "a" of the left table 31a is linked to the central position and right end position of the line segment of the second character string "AMERICA" in the right table 31b.

By use of the above table 31, a corresponding position is detected in the left table 31a based on the first character string and a vote is cast for a portion of the right table 31b which is linked with the position. Thus, votes corresponding to the characters of the first character string are cast for each second character string in the right table 31b.

As a result, values of the result of voting for each second character string with respect to the characters of the first character string are obtained in the right table 31b. Further, if values of the voting result for each second character string are obtained in the right table 31b, the right table 31b is sequentially searched from the top to effect the process of matching between the first character string and the second character string in the same manner as described above.

Thus, by previously setting the relation between the table in which characters of the first character string are stored and the table indicating the projected line segment for the second character string, a vote is directly cast for the line segment for each second character string from the first character string. Then, the result of matching with respect to each second character string is determined based on the values of the voting result for each second character string which are obtained as the result of voting.

Thus, the processing speed in the matching process can be enhanced.

Further, in the above embodiment, a case wherein only one first character string is used is explained, but since the first character string is obtained as a candidate of a recognized character string in the character recognition apparatus or the like, the characters of the first character string may be weighted and then the voting operation may be effected.

For example, in a case where the recognition result of each character is obtained as the order of character candidates, a point to be voted is weighted according to the order of the character candidate of the recognition result and voted. Further, if the recognition result of each character is obtained as the degree of similarity, a point weighted according to the degree of similarity of each character may be voted.

Thus, when the first character string is obtained as the result of character recognition, the highly precise matching process can be attained by casting a vote with each character of the first character string weighted.

Further, when the first character string is constructed by recognized characters and the degree of similarity of the recognized character is lower than a preset reference level, it is also possible not to cast a vote even if the character coincides with the character of the second character string.

As a result, when the first character string is constructed by recognized characters, the matching process can be effected after removing the character whose similarity is extremely low and thus the precision of the matching process with respect to the first character string constructed by recognized characters can be enhanced.

Further, if a plurality of candidates are obtained in the priority order for each character of the first character string as the result of character recognition, the plurality of candidates are used as each character of the first character string and the matching process may be effected by determining coincidence between the plurality of candidates and each character of the second character string. In this case, for example, a vote is cast even if the first candidate does not coincide but if the second candidate coincides.

Thus, when the first character string is constructed by recognized characters and if a plurality of candidates are obtained for each character as the recognized character, the highly precise matching process can be effected with a plurality of character candidates taken into consideration.

As described above, each character of the first character string is compared with each character of the second character string, a vote is cast for a matrix having two sides corresponding to the characters of the first character string and the characters of the second character string, and values of the voting result are calculated for respective components in an oblique direction of the matrix. The matching result is determined based on the calculated values of the voting result. As a result, the high-speed and highly precise matching process which is highly noise-resistant with the arrangement of characters taken into consideration can be attained.

As described above in detail, according to this invention, a pattern string matching apparatus, pattern string matching method, character string matching apparatus and character string matching method for effecting the high-speed and highly precise matching process which is highly noise-resistant, takes the arrangement of characters into consideration and can specify the noise position can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A character string matching apparatus for effecting a process for matching between a first character string, which comprises a plurality of characters as a result of a recognition of characters, and a second character string, which comprises a plurality of characters stored in a dictionary in advance, comprising:

a first table comprising a matrix of cells of rows and columns for specifying types of the characters appearing in the first character string and orders of the characters appearing in the first character string;

a second table comprising a one-row memory for voting for each second character sting, in which a calculated value of each of the components of various types of second character strings to be matched with respect to the first character string in the direction of the second character string is stored, the second table is provided with a link for the first table based on the type of each character in the second character string and the orders of appearance and types of the characters specified by the first table, wherein the link indicates the memory address of the voting position in the second table;

voting means for casting a vote to the second table with respect to each of the characters of the first character string which has been input based on a correspondency of the first table with the second table; and determining means for determining whether or not the first character string and the second character string are matched based on a result of voting to the second table as a result of the voting by said voting by the voting means executed with respect to all of the characters of the first character string.

2. The character string matching apparatus according to claim 1, wherein the first character string has recognized characters each having similarity, the second character string includes characters which are registered in a dictionary, and the voting means casts a vote weighted based on the similarity of each of the recognized characters of the first character string.

3. The character string matching method according to claim 2, wherein the voting means does not cast a vote where the similarity of each the recognized characters of the first character string is lower than a predetermined level.

4. The character sting matching apparatus according to claim 1, wherein the first character string includes character candidates each having the priority order, the second character string includes characters which are registered in a dictionary, and the voting means casts votes weighed based on the priority order of the character candidate of the first character string.

5. A character string matching method for effecting a process for matching between a first character string, which comprises a plurality of characters as a result of a recognition of characters, and a second character string, which comprises a plurality of characters stored in a dictionary in advance, comprising:

specifying types of the characters appearing in the first character string and orders of the characters appearing in the first character string by a first table comprising a matrix of cells of rows and columns;

providing a second table comprising a one-row memory for voting for each second character string, in which a calculated value of each of the components of various types of second character strings to be matched with respect to the first character string in the direction of the second character string is stored, and a link for the first table based on the type of each character in the second character string and the orders of appearance and types of the characters specified by the first table, wherein the link indicates the memory address of the voting position in the second table;

casting a vote to the second table with respect to each of the characters of the first character string which has been input, based on a correspondency of the first table with the second table; and determining whether or not the first character string and the second character string are matched based on the result of voting to the second table as a result of the voting by said voting by the voting means executed with respect to all of the characters of the first character string.

6. The character string matching method according to claim 5, comprising:

the first character string having recognized characters each having similarity;

the second character string having including characters which are registered in a dictionary; and the voting means casting votes weighed based on the degree of similarity of the recognized characters of the first character string.

7. The character string matching method according to claim 6, wherein the voting means does not cast a vote where the similarity of each of the recognized characters of the first character string is lower than a predetermined level.

8. The character string matching method according to claim 5, comprising:

the first character string including character candidates each having the priority order;

the second character string including characters which are registered in a dictionary; and the voting means casting votes weighed based on the priority order of the character candidate of the first character string.

* * * * *